United States Patent
Kim et al.

(10) Patent No.: US 11,315,557 B2
(45) Date of Patent: Apr. 26, 2022

(54) METHOD AND SYSTEM FOR PROVIDING VOICE RECOGNITION TRIGGER AND NON-TRANSITORY COMPUTER-READABLE RECORDING MEDIUM

(71) Applicant: VTOUCH CO., LTD., Seoul (KR)

(72) Inventors: Seok Joong Kim, Seoul (KR); Won Jin Jung, Seongnam-si (KR)

(73) Assignee: VTOUCH CO., LTD., Seoul (KR)

( * ) Notice: Subject to any disclaimer, the term of this patent is extended or adjusted under 35 U.S.C. 154(b) by 141 days.

(21) Appl. No.: 16/551,888

(22) Filed: Aug. 27, 2019

(65) Prior Publication Data

US 2019/0385605 A1 Dec. 19, 2019

Related U.S. Application Data

(63) Continuation of application No. PCT/KR2018/002337, filed on Feb. 26, 2018.

(30) Foreign Application Priority Data

Feb. 27, 2017 (KR) .................. 10-2017-0025738

(51) Int. Cl.
*G06F 3/13* (2006.01)
*G06F 3/0484* (2013.01)
(Continued)

(52) U.S. Cl.
CPC .............. *G10L 15/22* (2013.01); *G06N 20/00* (2019.01); *G10L 15/063* (2013.01); *G10L 15/24* (2013.01);
(Continued)

(58) Field of Classification Search
None
See application file for complete search history.

(56) References Cited

U.S. PATENT DOCUMENTS 8,218,397 B2 * 7/2012 Chan ..................... H04R 3/005
367/124
9,632,748 B2 * 4/2017 Faaborg ................. G10L 15/30
(Continued)

FOREIGN PATENT DOCUMENTS

JP 2000338995 A 12/2000
JP 2006251298 A 9/2006
(Continued)

OTHER PUBLICATIONS

International Search Report for PCT/KR2018/002337 dated Jun. 12, 2018.

*Primary Examiner* — Seong-Ah A Shin
(74) *Attorney, Agent, or Firm* — Dinsmore & Shohl LLP; Yongsok Choi, Esq.

(57) ABSTRACT

According to one aspect of the invention, there is provided a method for providing a voice recognition trigger, comprising the steps of: estimating a first distance, which is a distance between a device and a user, on the basis of proximity information detected by the device, and estimating a second distance, which is a distance between the device and a location where a voice detected by the device is uttered, with reference to information on the voice detected by the device; and determining whether the voice detected by the device is an object of voice recognition, with reference to similarity between the first distance and the second distance.

14 Claims, 2 Drawing Sheets

(51) Int. Cl.
  *G10L 15/22* (2006.01)
  *G06N 20/00* (2019.01)
  *G10L 15/06* (2013.01)
  *G10L 15/24* (2013.01)
  *G10L 25/84* (2013.01)

(52) U.S. Cl.
  CPC ........ *G10L 25/84* (2013.01); *G10L 2015/223* (2013.01)

(56) References Cited

U.S. PATENT DOCUMENTS

| | | | | |
|---|---|---|---|---|
| 9,830,924 | B1* | 11/2017 | Degges, Jr. | G10L 15/22 |
| 9,972,339 | B1* | 5/2018 | Sundaram | G10L 25/78 |
| 10,027,662 | B1* | 7/2018 | Mutagi | G10L 15/22 |
| 10,074,359 | B2* | 9/2018 | Silveira Ocampo | G10L 15/22 |
| 10,388,280 | B2* | 8/2019 | Agrawal | G10L 15/22 |
| 10,811,002 | B2* | 10/2020 | Cho | G10L 15/22 |
| 2013/0094668 | A1* | 4/2013 | Poulsen | H03G 11/002 |
| | | | | 381/107 |
| 2013/0275077 | A1* | 10/2013 | Kim | G01S 3/80 |
| | | | | 702/141 |
| 2014/0081630 | A1* | 3/2014 | Jung | G10L 21/00 |
| | | | | 704/225 |
| 2014/0142927 | A1* | 5/2014 | Campbell | G10L 21/00 |
| | | | | 704/201 |
| 2014/0330560 | A1* | 11/2014 | Venkatesha | G10L 15/26 |
| | | | | 704/235 |
| 2015/0039310 | A1* | 2/2015 | Clark | G10L 15/063 |
| | | | | 704/244 |
| 2015/0170635 | A1 | 6/2015 | Fleizach et al. | |
| 2015/0302870 | A1* | 10/2015 | Burke | G10L 17/00 |
| | | | | 704/246 |
| 2015/0340040 | A1* | 11/2015 | Mun | G10L 17/22 |
| | | | | 704/246 |
| 2015/0346912 | A1* | 12/2015 | Yang | G06F 3/0488 |
| | | | | 715/727 |
| 2016/0156761 | A1* | 6/2016 | Beaurepaire | G10L 25/78 |
| | | | | 455/414.1 |
| 2016/0284350 | A1* | 9/2016 | Yun | G06F 3/167 |
| 2017/0025121 | A1* | 1/2017 | Tang | G10L 17/06 |
| 2017/0075548 | A1* | 3/2017 | Fukazawa | G06F 3/04845 |
| 2017/0311092 | A1* | 10/2017 | Secall | H04R 25/505 |
| 2018/0151180 | A1* | 5/2018 | Yehuday | G10L 15/24 |
| 2018/0284887 | A1* | 10/2018 | Fan | G06F 3/013 |
| 2019/0037173 | A1* | 1/2019 | Lee | H04W 4/18 |

FOREIGN PATENT DOCUMENTS

| | | |
|---|---|---|
| KR | 20110100620 A | 9/2011 |
| KR | 20150113701 A | 10/2015 |

* cited by examiner

METHOD AND SYSTEM FOR PROVIDING VOICE RECOGNITION TRIGGER AND NON-TRANSITORY COMPUTER-READABLE RECORDING MEDIUM

CROSS-REFERENCE TO RELATED APPLICATION(S)

This application is a continuation application of Patent Cooperation Treaty (PCT) International Application Serial No. PCT/KR2018/002337, filed on Feb. 26, 2018, which claims priority to Korean Patent Application Serial No. 10-2017-0025738, filed on Feb. 27, 2017. The entire contents of PCT International Application Serial No. PCT/KR2018/002337, and Korean Patent Application Serial No. 10-2017-0025738 are hereby incorporated by reference.

FIELD OF THE INVENTION

The present invention relates to a method, system and non-transitory computer-readable recording medium for providing a voice recognition trigger.

BACKGROUND

Recently, IT devices with voice recognition functions are increasing as interest in user interfaces is increased and voice processing technologies are developed. For example, smart phones, smart watches, smart TVs, smart refrigerators and the like are widely used, which can recognize a voice of a user and perform an operation requested by the user. As an example of such a prior art, Korean Laid-Open Patent Publication No. 2016-39244 has introduced a technique of determining whether a voice-initiated action is included in audio data when a computing device receives the audio data, and providing a user with a display indicating that the voice-initiated action is recognized through the computing device, when it is determined that the voice-initiated action is included in the audio data.

However, according to the techniques introduced so far as well as the above-described conventional technique, a user should press a button or input a predetermined trigger word to specify a point when the user starts a voice input, before the user starts the voice input. The former method of pressing a button is inconvenient because the user cannot perform the voice input when the user cannot use his/her hands freely. The latter method of speaking a predetermined trigger word has limitations in that it is difficult to specify the starting point of the voice input due to various noises (e.g., voices of others) produced in the same space even when the user moves just a little bit away from a voice recognition device, and it takes quite a long time to start the voice input because the user can start the voice input only after sound or light feedback is given in order to assure the user that the voice input has started, even if the user speaks the predetermined trigger word.

In this connection, the inventor(s) present a technique for a voice recognition trigger, which estimates a distance between a user and a device for detecting a voice, and a distance between the device and a location where a voice detected by the device is uttered, and determines that the voice detected by the device is an object of voice recognition, when the two estimated distances are similar at or above a predetermined level.

SUMMARY OF THE INVENTION

One object of the present invention is to solve all the above-described problems.

Another object of the invention is to assist a user to quickly input a voice by eliminating unnecessary processes for starting a voice input.

Yet another object of the present invention is to minimize the influence of ambient noise by allowing a voice to be inputted in proximity to a device, and to provide a voice recognition trigger that is accurately activated even with a small voice.

The representative configurations of the invention to achieve the above objects are described below.

According to one aspect of the invention, there is provided a method for providing a voice recognition trigger, comprising the steps of: estimating a first distance, which is a distance between a device and a user, on the basis of proximity information detected by the device, and estimating a second distance, which is a distance between the device and a location where a voice detected by the device is uttered, with reference to information on the voice detected by the device; and determining whether the voice detected by the device is an object of voice recognition, with reference to similarity between the first distance and the second distance.

According to another aspect of the invention, there is provided a system for providing a voice recognition trigger, comprising: an estimation unit configured to estimate a first distance, which is a distance between a device and a user, on the basis of proximity information detected by the device, and to estimate a second distance, which is a distance between the device and a location where a voice detected by the device is uttered, with reference to information on the voice detected by the device; and a determination unit configured to determine whether the voice detected by the device is an object of voice recognition, with reference to similarity between the first distance and the second distance.

In addition, there are further provided other methods and systems to implement the invention, as well as non-transitory computer-readable recording media having stored thereon computer programs for executing the methods.

According to the invention, it is possible to assist a user to quickly input a voice by eliminating unnecessary processes for starting a voice input.

According to the invention, it is possible to minimize the influence of ambient noise by allowing a voice to be inputted in proximity to a device, and to provide a voice recognition trigger that is accurately activated even with a small voice.

DETAILED DESCRIPTION

Figure 1:
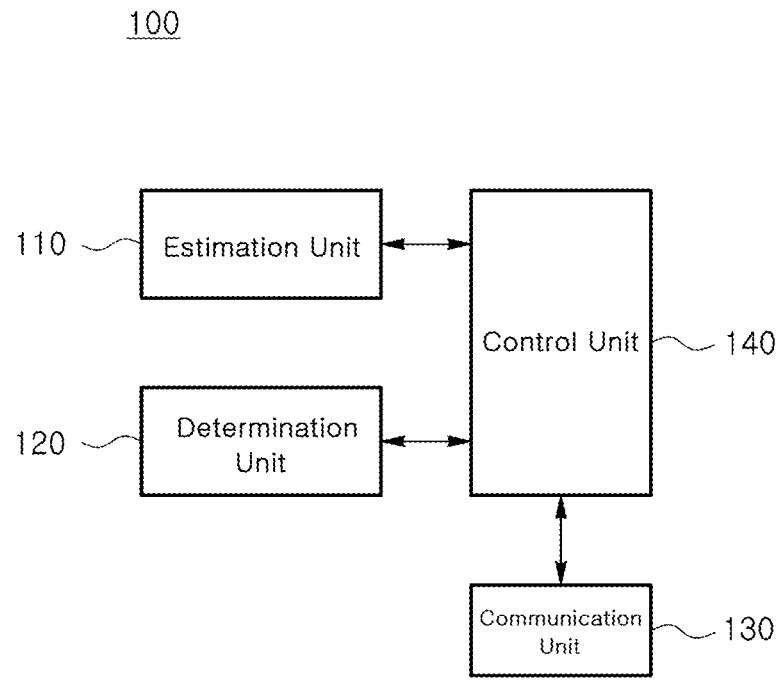
FIG. 1 illustratively shows the internal configuration of a voice recognition system according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Furthermore, it shall be understood that the positions or arrangements of individual elements within each of the disclosed embodiments may also be modified without departing from the spirit and scope of the invention. Therefore, the following detailed description is not to be taken in a limiting sense, and the scope of the invention, if properly described, is limited only by the appended claims together with all equivalents thereof. In the drawings, like reference numerals refer to the same or similar functions throughout the several views.

Hereinafter, preferred embodiments of the present invention will be described in detail with reference to the accompanying drawings to enable those skilled in the art to easily implement the invention.

Configuration of a Voice Recognition System

Hereinafter, the internal configuration of a voice recognition system 100 crucial for implementing the invention and the functions of the respective components thereof will be discussed.

FIG. 1 illustratively shows the internal configuration of the voice recognition system 100 according to one embodiment of the invention.

Referring to FIG. 1, the voice recognition system 100 according to one embodiment of the invention may comprise an estimation unit 110, a determination unit 120, a communication unit 130, and a control unit 140. According to one embodiment of the invention, at least some of the estimation unit 110, the determination unit 120, the communication unit 130, and the control unit 140 may be program modules to communicate with an external system (not shown). The program modules may be included in the voice recognition system 100 in the form of operating systems, application program modules, and other program modules, while they may be physically stored in a variety of commonly known storage devices. Further, the program modules may also be stored in a remote storage device that may communicate with the voice recognition system 100. Meanwhile, such program modules may include, but not limited to, routines, subroutines, programs, objects, components, data structures, and the like for performing specific tasks or executing specific abstract data types as will be described below in accordance with the invention.

Meanwhile, although the voice recognition system 100 has been described as above, the above description is illustrative, and it will be apparent to those skilled in the art that at least a part of the components or functions of the voice recognition system 100 may be implemented or included in a device 200 worn by a user or worn on a body part (e.g., a head, eye, finger, wrist, ear, neck, etc.) of the user, as necessary. Further, in some cases, all of the functions and components of the voice recognition system 100 may be implemented or included in the device 200.

The device 200 according to one embodiment of the invention is digital equipment having a memory means and a microprocessor for computing capabilities, and may include a wearable device such as smart glasses, a smart watch, a smart band, a smart ring, a smart necklace, a smart earset, smart earphones, and smart earrings, or include a somewhat traditional device such as a smart phone, a smart pad, a desktop computer, a notebook computer, a workstation, a personal digital assistant (PDA), a web pad, a mobile phone, and a remote controller. Besides the foregoing examples, the device 200 may be changed without limitation as long as the objects of the invention may be achieved. Further, the device 200 according to one embodiment of the invention may include a microphone module (not shown) for recognizing or detecting a voice, and may include a proximity sensing module (not shown) for detecting a distance between the device 200 and the user, or a voice distance recognition module (not shown) for detecting a distance between the device 200 and a location where a voice detected by the device 200 is uttered.

Meanwhile, the device 200 according to one embodiment of the invention may include an application for assisting in performing the functions of providing a voice recognition trigger according to the invention. The application may be downloaded from an external application distribution server (not shown). The characteristics of the program module may be generally similar to those of the estimation unit 110, the determination unit 120, the communication unit 130, and the control unit 140 of the voice recognition system 100 to be described below. Here, at least a part of the application may be replaced with a hardware device or a firmware device that may perform a substantially equal or equivalent function, as necessary.

First, the estimation unit 110 according to one embodiment of the invention may estimate a first distance, which is a distance between the device 200 and the user, on the basis of proximity information detected by the device 200.

Specifically, the estimation unit 110 according to one embodiment of the invention may estimate the first distance by obtaining information on a physical distance between the user and the device 200 from the proximity information detected by the device 200. To this end, the device 200 may include at least one sensing module (not shown) for detecting the proximity information. According to one embodiment of the invention, the sensing module may include at least one of known sensors such as an optical sensor, a photoelectric sensor, an ultrasonic sensor, an inductive sensor, a capacitive sensor, a resistive sensor, an eddy current sensor, an infrared sensor, and a magnetic sensor.

Further, according to one embodiment of the invention, the estimation unit 110 may estimate a second distance, which is a distance between the device 200 and a location where a voice detected by the device 200 is uttered, with reference to information on the voice detected by the device 200. According to one embodiment of the invention, the information on the voice detected by the device 200 may include an intensity, a waveform, and a frequency spectrum of the voice.

Specifically, the estimation unit 110 according to one embodiment of the invention may estimate the second distance, which is the distance between the device 200 and the location where the voice detected by the device 200 is uttered, by comparing the voice detected by the device 200 and a voice pattern thereof. According to one embodiment of the invention, the voice pattern may include a pattern of linear predictive coefficients (LPC) or perceptual linear prediction (PLP) coefficients representing voice spectrum information; a pattern of mel-frequency cepstral coefficients (MFCC) based on a human auditory model; and a pattern of a convolutional neural network (CNN) trained through machine learning or deep learning, or discriminative training.

For example, the estimation unit 110 according to one embodiment of the invention may estimate the distance between the device 200 and the location where the voice detected by the device 200 is uttered (i.e., the second distance) by comparing the voice detected by the device 200 and a voice pattern appearing according to a distance between the location where the voice is uttered and the location where the voice is detected. To this end, the estimation unit 110 according to one embodiment of the invention may refer to a predetermined voice pattern that appears according to a distance between a location where a voice is uttered and a location where the voice is detected, and may also refer to a database that stores information on a voice pattern appearing according to a distance between a location where a voice is uttered and a location where the voice is detected.

Meanwhile, through machine learning or deep learning for a voice uttered in at least one location, the estimation unit 110 according to one embodiment of the invention may also obtain a voice pattern according to the location where the voice is uttered. In this case, the estimation unit 110 according to one embodiment of the invention may estimate the distance between the device 200 and the location where the voice detected by the device 200 is uttered (i.e., the second distance) by comparing the voice detected by the device 200 and the voice pattern according to the location where the voice is uttered, which is obtained through the machine learning or deep learning. For the machine learning or deep learning, the estimation unit 110 according to one embodiment of the invention may employ at least one of known algorithms using a component analysis, matrix factorization, expectation maximization, hidden Markov model, Kalman filtering, k-nearest neighbor, boosting, support vector machine, association rule, confusion matrix, co-occurance matrix, wavelet, maximum likelihood, Gaussian mixture model, decision tree, and the like.

Meanwhile, the estimation unit 110 according to one embodiment of the invention may employ at least one of known voice separation algorithms such as a likelihood ratio test (LRT) and blind source separation (BSS) in order to separate a voice and ambient noise with reference to the information on the voice detected by the device 200.

For example, the estimation unit 110 according to one embodiment of the invention may analyze signals detected from a plurality of voice recognition modules (not shown) of the device 200 through a BSS algorithm, thereby separating ambient noise from the voice detected by the device 200.

Next, the determination unit 120 according to one embodiment of the invention may determine whether the voice detected by the device 200 is an object of voice recognition, with reference to similarity between the first and second distances estimated by the estimation unit 110.

Specifically, when it is determined that the similarity between the distance between the device 200 and the user (i.e., the first distance) and the distance between the device 200 and the location where the voice detected by the device 200 is uttered (i.e., the second distance) is not less than a predetermined level, the determination unit 120 according to one embodiment of the invention may determine that the voice detected by the device 200 is an object of voice recognition. According to one embodiment of the invention, the predetermined level may be a criterion that is appropriately defined within a range for allowing a sensing (or recognition) module for measuring the first or second distance or a method for estimating the first or second distance to determine that the first and second distances are equal or similar.

For example, according to one embodiment of the invention, it may be assumed that a user utters a voice with the device 200 being positioned at a body part of the user (e.g., 3 cm from lips of the user) and that a distance between the device 200 and the user (i.e., a first distance) is estimated to be 2.8 cm, and a distance between the device 200 and a location where a voice detected by the device 200 is uttered (i.e., a second distance) is estimated to be 3 cm. In this case, the determination unit 120 may determine that the difference between the first and second distances is 0.2 cm and thus negligible, and that the voice detected by the device 200 is an object of voice recognition.

Further, the determination unit 120 according to one embodiment of the invention may determine whether the voice detected by the device 200 is an object of voice recognition, with further reference to whether the distance between the device 200 and the user (i.e., the first distance) and/or the distance between the device 200 and the location where the voice detected by the device 200 is uttered (i.e., the second distance) is within a predetermined distance.

For example, according to one embodiment of the invention, it may be assumed that a user utters a voice with the device 200 being positioned at a body part of the user (e.g., 25 cm from lips of the user) and that the estimation unit 110 estimates a distance between the device 200 and the user (i.e., a first distance) to be 25 cm and estimates a distance between the device 200 and a location where a voice detected by the device 200 is uttered (i.e., a second distance) to be 25.4 cm. In this case, the determination unit 120 may determine that the voice detected by the device 200 is not an object of voice recognition since the first distance and/or the second distance is greater than a predetermined distance (e.g., 10 cm), even though the difference between the first and second distances is negligible (0.4 cm in this case). That is, in this case, a voice recognition trigger according to the invention may be provided only when the user positions the device 200 in a location close to a body part of the user according to one embodiment of the invention.

Meanwhile, the determination unit 120 according to one embodiment of the invention may determine whether the voice detected by the device 200 is an object of voice recognition, with further reference to whether the voice detected by the device 200 is uttered from a human body.

Specifically, the determination unit 120 according to one embodiment of the invention may analyze the information on the voice detected by the device 200 to determine whether the voice is uttered from a human body, and may determine whether the voice detected by the device 200 is an object of voice recognition, with reference to the result of the above determination. According to one embodiment of the invention, when it is determined that the voice detected by the device 200 is not uttered from a human body, the determination unit 120 may determine that the voice detected by the device 200 is not an object of voice recognition, even if it is determined that the first and second distances are similar. According to one embodiment of the invention, the determination unit 120 may employ at least one of known analysis algorithms such as an algorithm using a garbage model, an algorithm of Rabiner and Sambur using energy and zero-crossing, an algorithm of Lamel using a level equalizer, and an algorithm of Teager using energy, in order to determine whether the voice detected by the device 200 is uttered from a human body.

For example, the estimation unit 110 according to one embodiment of the invention may apply an algorithm using garbage modeling in order to determine whether the voice detected by the device 200 is uttered from a human body. In this case, the estimation unit 110 may define keywords that are to be determined as voices, and may give weight scores to voice keyword signals and give penalty scores to noise signals other than the voice keyword signals. When a score given to the voice detected by the device 200 is not less than a predetermined level, the estimation unit 110 may determine that the voice detected by the device 200 is uttered from a human body.

Next, according to one embodiment of the invention, the communication unit 130 may function to enable data transmission/reception from/to the estimation unit 110 and the determination unit 120.

Lastly, according to one embodiment of the invention, the control unit 140 may function to control data flow among the estimation unit 110, the determination unit 120, and the communication unit 130. That is, the control unit 140 may control data flow into/out of the voice recognition system 100 or data flow among the respective components of the voice recognition system 100, such that the estimation unit 110, the determination unit 120, and the communication unit 130 may carry out their particular functions, respectively.

Figure 2:
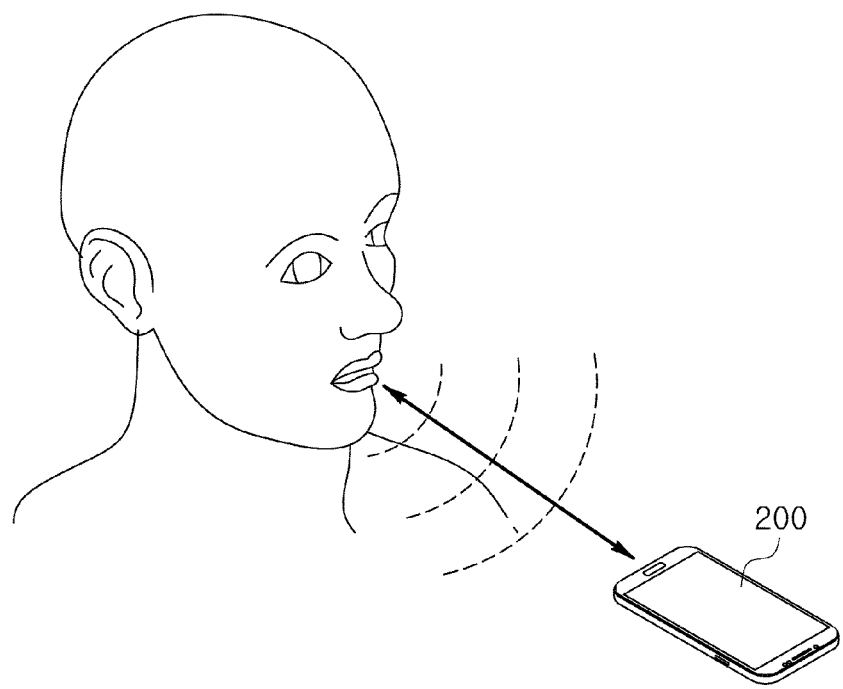
FIG. 2 illustratively shows a situation in which a voice recognition trigger is provided through the voice recognition system according to one embodiment of the invention.

FIG. 2 illustratively shows a situation in which a voice recognition trigger is provided through the voice recognition system 100 according to one embodiment of the invention.

Referring to FIG. 2, it may be assumed that a voice recognition trigger is provided to a user who uses a smart phone 200 including the voice recognition system 100 according to one embodiment of the invention. According to one embodiment of the invention, when the user positions the smart phone 200 close to lips of the user, the voice recognition system 100 may estimate a distance between the smart phone 200 and the user (i.e., a first distance) on the basis of proximity information detected by a distance detection sensor (not shown) of the smart phone 200. When the user utters a voice, the voice recognition system 100 may estimate a distance between the smart phone 200 and a location where a voice detected by the smart phone 200 is uttered (i.e., a second distance) by comparing a voice detected by a microphone module (not shown) of the smart phone 200 and a voice pattern appearing according to the distance between the smart phone 200 and the location where the voice detected by the smart phone 200 is uttered.

Next, the voice recognition system 100 according to one embodiment of the invention may determine whether the voice detected by the smart phone 200 is an object of voice recognition, with reference to similarity between the first and second distances estimated as above. That is, a voice recognition trigger may be provided to the user when the voice recognition system 100 according to one embodiment of the invention determines that the voice detected by the smart phone 200 is the object of voice recognition. Therefore, through the technique of providing a voice recognition trigger according to the invention, it is possible to shorten the time that a user takes to input a voice by eliminating unnecessary processes for starting a voice input. Further, it is also possible to minimize the influence of ambient noise by allowing a voice to be inputted in proximity to the device, and to provide a voice recognition trigger that is accurately activated even with a small voice of the user.

Figure 3:
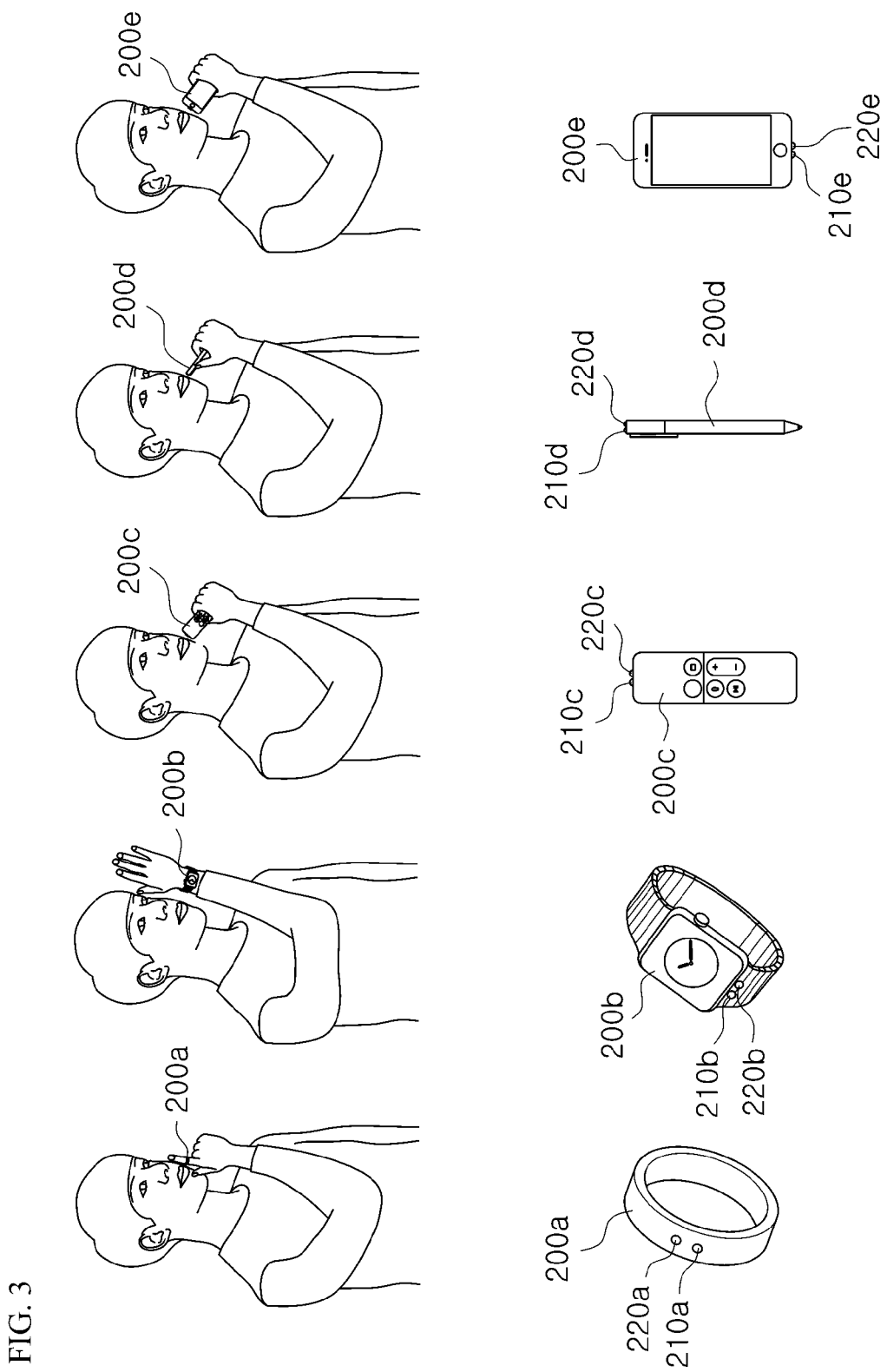
FIG. 3 illustratively shows various embodiments in which the voice recognition system according to one embodiment of the invention may be utilized.

FIG. 3 illustratively shows various embodiments in which the voice recognition system 100 according to one embodiment of the invention may be utilized.

Referring to FIG. 3, according to one embodiment of the invention, it may be assumed that a voice recognition trigger is provided to a user as the user utters a voice with a smart ring 200a, a smart watch 200b, a smart remote controller 200c, a smart pen 200d, or a smart phone 200e (including the voice recognition system 100 according to the invention) being positioned close to a mouth (or lips) of the user. According to one embodiment of the invention, the device 200a, 200b, 200c, 200d or 200e may include a sensing module 210a, 210b, 210c, 210d or 210e for detecting proximity information, or a recognition module 220a, 220b, 220c, 220d or 220e for detecting voice information. The sensing module 210a, 210b, 210c, 210d or 210e for detecting proximity information may be disposed in a location physically close to the recognition module 220a, 220b, 220c, 220d or 220e for detecting voice information, so that the objects of the invention may be achieved.

Further, according to one embodiment of the invention, when it is determined that a distance between the device 200a, 200b, 200c, 200d or 200e and the user (i.e., a first distance) and a distance between the device 200a, 200b, 200c, 200d or 200e and a location where a voice detected by the device 200a, 200b, 200c, 200d or 200e is uttered (i.e., a second distance) are similar at or above a predetermined level and are within a predetermined distance (i.e., when it is determined that the first and second distances are equal or similar, in a state in which the device 200a, 200b, 200c, 200d or 200e is positioned in proximity to the mouth or lips of the user), the voice detected by the device 200a, 200b, 200c, 200d or 200e is determined to be an object of voice recognition, so that the objects of the invention may be achieved.

The embodiments according to the invention as described above may be implemented in the form of program instructions that can be executed by various computer components, and may be stored on a non-transitory computer-readable recording medium. The non-transitory computer-readable recording medium may include program instructions, data files, data structures and the like, separately or in combination. The program instructions stored on the non-transitory computer-readable recording medium may be specially designed and configured for the present invention, or may also be known and available to those skilled in the computer software field. Examples of the non-transitory computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler or the like, but also high-level language codes that can be executed by a computer using an interpreter or the like. The above hardware devices may be configured to operate as one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method for providing a voice recognition trigger, comprising the steps of:

estimating a first distance, which is a distance between a device and a user, on the basis of proximity information detected by the device, and estimating a second distance, which is a distance between the device and a location where a voice detected by the device is uttered, with reference to information on the voice detected by the device; and determining whether the voice detected by the device is an object of voice recognition, with reference to similarity between the first distance and the second distance, wherein, in the determining step, it is determined whether the voice detected by the device is an object of voice recognition, with reference to whether the first distance and the second distance are similar at or above a predetermined level, wherein the second distance is estimated by comparing the voice detected by the device and a voice pattern varied depending on a distance between a location where a voice is uttered and a location where the voice is detected, and wherein the voice pattern is obtained through machine learning or deep learning for a voice uttered in at least one location.

2. The method of claim 1, wherein the proximity information is obtained from at least one of an optical sensor, a photoelectric sensor, an ultrasonic sensor, an inductive sensor, a capacitive sensor, a resistive sensor, an eddy current sensor, an infrared sensor, and a magnetic sensor.

3. The method of claim 1, wherein, in the estimating step, ambient noise is separated from the voice detected by the device, with reference to the information on the voice detected by the device.

4. The method of claim 1, wherein, in the determining step, it is determined whether the voice detected by the device is an object of voice recognition, with further reference to whether the voice detected by the device is uttered from a human body.

5. The method of claim 1, wherein, in the determining step, it is determined that the voice detected by the device is an object of voice recognition in response to determining that a difference between the first distance and the second distance is less than a threshold value and determining that the first distance or the second distance is less than a predetermined distance.

6. A non-transitory computer-readable recording medium having stored thereon a computer program for executing the method of claim 1.

7. The non-transitory computer-readable recording medium of claim 6, wherein the proximity information is obtained from at least one of an optical sensor, a photoelectric sensor, an ultrasonic sensor, an inductive sensor, a capacitive sensor, a resistive sensor, an eddy current sensor, an infrared sensor, and a magnetic sensor.

8. The non-transitory computer-readable recording medium of claim 6, wherein, in the estimating step, ambient noise is separated from the voice detected by the device, with reference to the information on the voice detected by the device.

9. The non-transitory computer-readable recording medium of claim 6, wherein, in the determining step, it is determined whether the voice detected by the device is an object of voice recognition, with further reference to whether the voice detected by the device is uttered from a human body.

10. The non-transitory computer-readable recording medium of claim 6, wherein, in the determining step, it is determined that the voice detected by the device is an object of voice recognition in response to determining that a difference between the first distance and the second distance is less than a threshold value and determining that the first distance or the second distance is less than a predetermined distance.

11. The method of claim 1, further comprising:
determining whether a difference between the first distance and the second distance is less than a threshold value; and
determining that the voice detected by the device is an object of voice recognition in response to determining that the difference between the first distance and the second distance is less than a threshold value.

12. The non-transitory computer-readable recording medium of claim 6, wherein the method further comprises:
determining whether a difference between the first distance and the second distance is less than a threshold value; and
determining that the voice detected by the device is an object of voice recognition in response to determining that the difference between the first distance and the second distance is less than a threshold value.

13. A system for providing a voice recognition trigger, comprising:
a processor programmed to:
estimate a first distance, which is a distance between a device and a user, on the basis of proximity information detected by the device, and to estimate a second distance, which is a distance between the device and a location where a voice detected by the device is uttered, with reference to information on the voice detected by the device; and
determine whether the voice detected by the device is an object of voice recognition, with reference to similarity between the first distance and the second distance,
wherein the processor is programmed to determine whether the voice detected by the device is an object of voice recognition, with reference to whether the first distance and the second distance are similar at or above a predetermined level,
wherein the second distance is estimated by comparing the voice detected by the device and a voice pattern varied depending on a distance between a location where a voice is uttered and a location where the voice is detected, and
wherein the voice pattern is obtained through machine learning or deep learning for a voice uttered in at least one location.

14. The system of claim 13, wherein the determination is further configured to:
determine whether a difference between the first distance and the second distance is less than a threshold value; and
determine that the voice detected by the device is an object of voice recognition in response to determining that the difference between the first distance and the second distance is less than a threshold value.

* * * * *